United States Patent [19]

Wawro

[11] 4,364,834
[45] Dec. 21, 1982

[54] SEDIMENTATION APPARATUS HAVING AN IMPROVED SKIMMING MECHANISM

[75] Inventor: Walter G. Wawro, Longmont, Colo.

[73] Assignee: Envirotech Corporation, Menlo Park, Calif.

[21] Appl. No.: 320,141

[22] Filed: Nov. 10, 1981

[51] Int. Cl.³ .............................................. B01D 21/18
[52] U.S. Cl. ...................................... 210/525; 210/530
[58] Field of Search ............... 210/523, 525, 528, 530, 210/531

[56] References Cited

U.S. PATENT DOCUMENTS

| | | | |
|---|---|---|---|
| 2,305,929 | 12/1942 | Lund et al. | 210/525 |
| 2,568,452 | 9/1951 | Kelly et al. | 210/525 X |
| 2,633,989 | 4/1953 | Kelly et al. | 210/525 X |
| 2,647,870 | 8/1953 | Kelly et al. | 210/525 X |
| 2,651,615 | 9/1953 | Kelly et al. | 210/525 X |
| 2,734,634 | 2/1956 | Knowles | 210/525 |
| 2,780,361 | 2/1957 | Evans et al. | 210/525 X |
| 2,822,928 | 2/1958 | Wormser et al. | 210/523 |
| 2,876,863 | 3/1959 | Kivari | 210/525 X |
| 3,140,259 | 7/1964 | Kelly | 210/525 X |
| 3,327,867 | 6/1967 | Hikes | 210/525 |
| 3,353,677 | 11/1967 | Thayer et al. | 210/530 X |
| 3,465,887 | 9/1969 | Cookney | 210/525 |
| 3,627,132 | 12/1971 | Kelly et al. | 210/525 X |
| 3,741,399 | 6/1973 | Peterson | 210/525 |
| 3,770,132 | 11/1973 | Quast et al. | 210/525 |
| 3,919,090 | 11/1975 | Shaffer | 210/523 |
| 4,193,877 | 3/1980 | Lillywhite | 210/525 X |

Primary Examiner—Robert H. Spitzer

[57] ABSTRACT

A rotary sedimentation apparatus (10), such as a clarifier or thickener, includes a conventional rake arm structure (26, 28, 30) adapted to urge sedimented sludge toward the center of the bottom wall of the apparatus and a centrally mounted drive and lift unit (24) adapted to rotate the rake arm structure. The lifting unit includes an inner cage (84) that is adapted to rotate with the rake arms but to remain at the same elevation when the rake arms are lifted. An improved scum skimming mechanism (12) includes a flat elongate inner blade 40 that is connected by two cables (66 and 68) to the inner cage (84) so that the inner blade remains partially submerged at the liquid level, even though the rake arm structure may be raised. The inner blade is vertically slideably mounted to the upper end of the support frame (50) that extends upwardly from the outer end of a rake arm (30). An outer blade assembly (42) is pivotally mounted to the outer end of the inner blade, such outer blade being adapted to push scum into a scum collecting box (44) located at the periphery of the apparatus.

3 Claims, 4 Drawing Figures

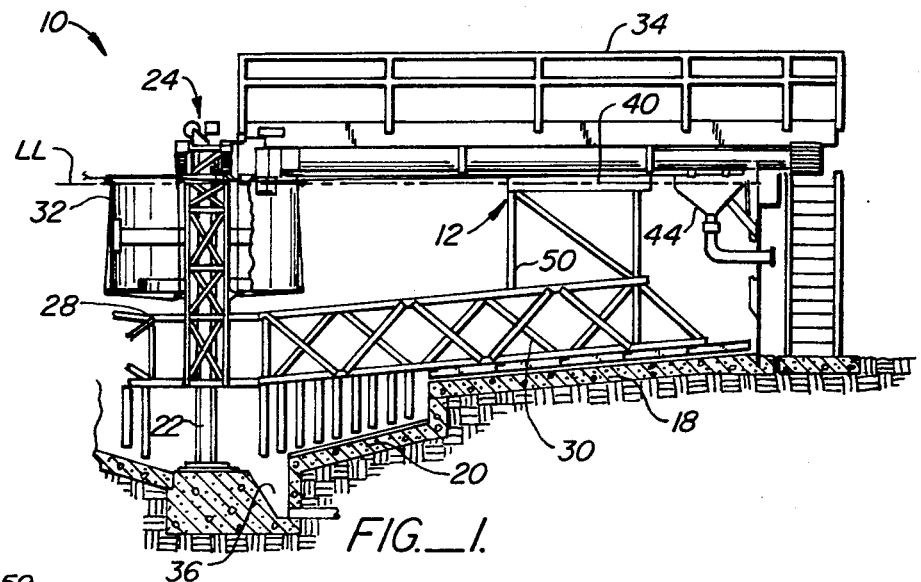
FIG._1.
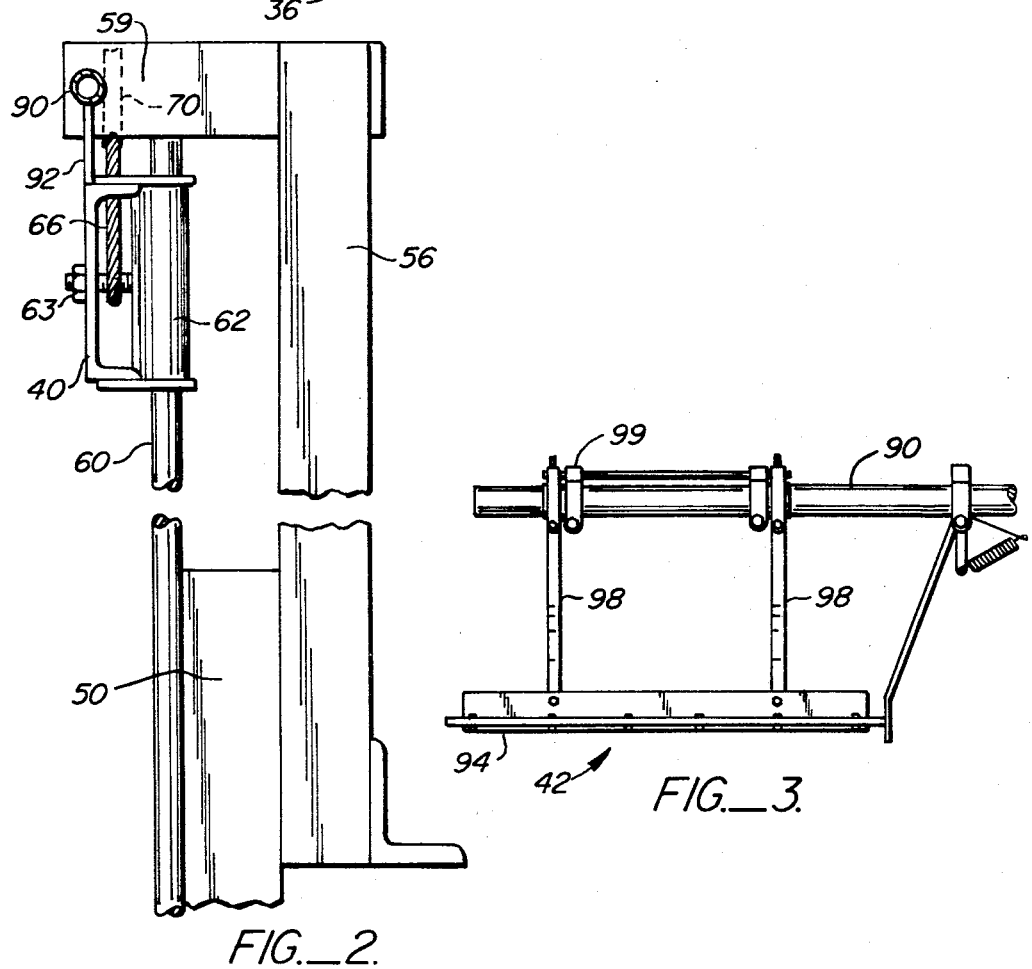
FIG._2.
FIG._3.

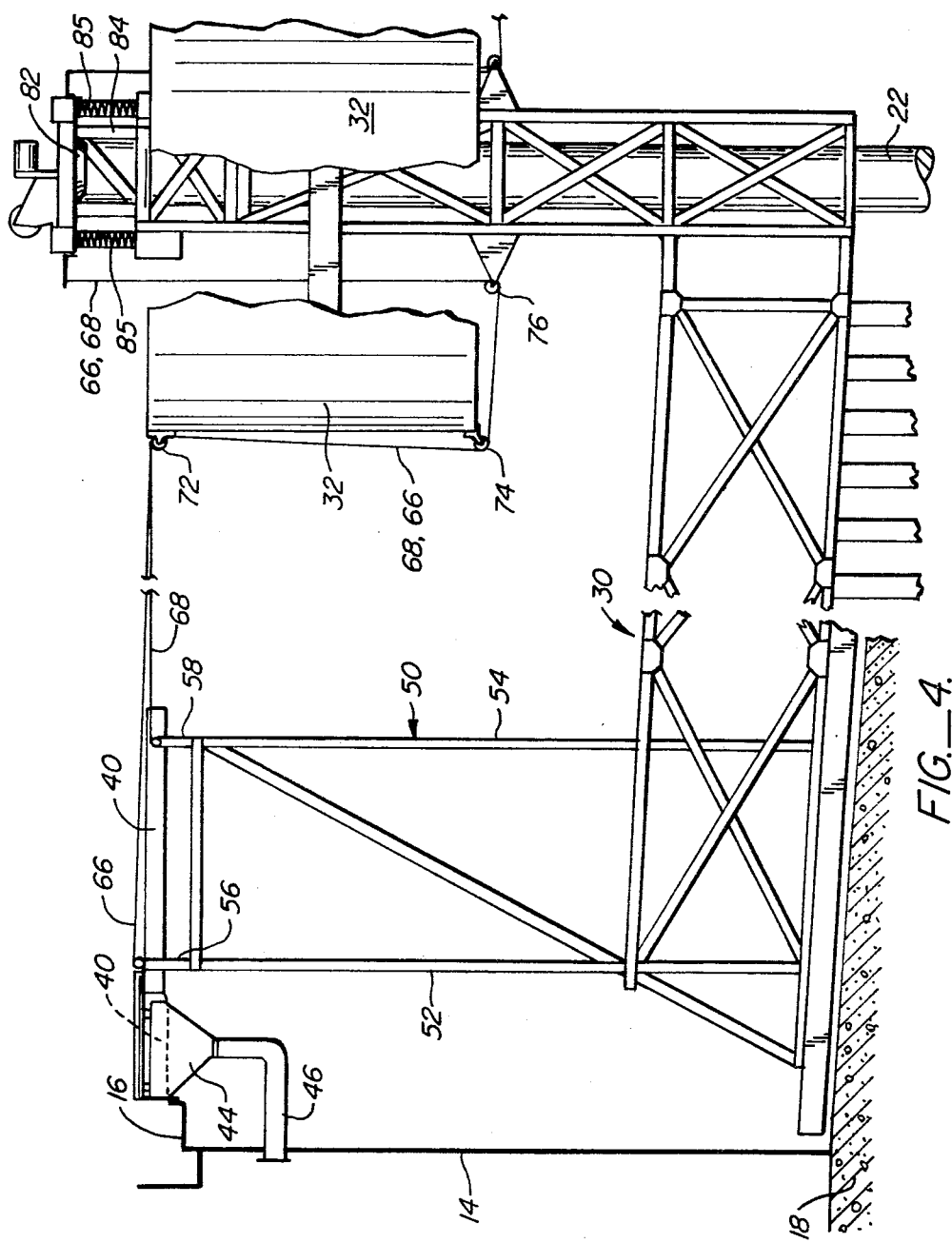
FIG._4.

SEDIMENTATION APPARATUS HAVING AN IMPROVED SKIMMING MECHANISM

BACKGROUND OF THE INVENTION

This invention generally relates to sedimentation apparatus for separating liquid from a mixture of liquid and solids, such as clarifiers or thickeners, and more particularly, this invention concerns a rotary clarifier or thickener having an improved device for skimming suspended solids or froth, hereinafter called scum, from the surface of the liquid therein.

Clarifiers and thickeners have been employed for many years in water pollution control plants and industrial waste treatment installations to remove solids from liquids. A current example of a rotary clarifier is disclosed in trade literature of the assignee of the present invention entitled, "Eimco Clari-Thickener TM Sludge Thickening Clarifier". As disclosed therein, scum is mechanically skimmed from the surface of the liquid in the clarifier, so that relatively clean effluent will overflow into an annular launder at the periphery of the clarifier tank. The skimmer includes a fixed portion and a pivotable portion connected to the outer end of the fixed portion. The pivotal portion is adapted to urge the scum into a scum box that is mounted to the clarifier tank. It is noted that the scum is induced to move toward the periphery of the clarifier by the outward flow of the effluent into the peripheral launder.

The U.S. Pat. No. 2,647,870 issued in August, 1953 to Kelly et al also describes a clarifier including a conventional skimmer mechanism for the removal of froth and scum similar to that used in the just mentioned prior art rotary clarifier.

U.S. Pat. No. 2,633,989 issued in April, 1953 to Kelly et al, discloses a variable level skimmer from liquid passing through an elongated tank (referred to therein as a skimming pond). The skimmer includes a level controller that employs a motor adapted to raise or lower a travelling framework to which the skimmer blades are attached.

SUMMARY OF THE INVENTION

According to the present invention, a rotary sedimentation apparatus such as a clarifier or thickener includes a skimming mechanism that remains partially submerged at liquid surface level even as the rake arms are raised or lowered within the apparatus. The sedimentation apparatus will, for the sake of simplicity, be referred to as a clarifier. The clarifier is of the general type that includes a cylindrical tank, a rake arm structure for pushing the sludge within the bottom of the tank toward the center of the tank for removal, and a drive and lift unit at the center of the clarifier tank that is connected to the rake arm structure for rotating the arm structure and also for either selectively or automatically lifting the rake arm structure. The liquid level within the clarifier is maintained at a selected level, for example, by an annular weir that is adjustably connected at the periphery of the clarifier tank. The improved skimming mechanism includes a support structure extending vertically upwardly from the rake arm structure. An inner skimmer blade is mounted to the support structure to move vertically, and the blade is suspended from at least one but preferably two cables that are moored to that part of the drive and lift unit which rotates with the rake arm structure but which is not lifted (or lowered) with the rake arm structure. This cable connection therefore maintains the inner skimmer blade at the liquid level, even though the drive and lift unit may lift or lower the rake arms. The skimming mechanism further includes a second skimmer blade that is pivotally suspended upon a support member extending radially outwardly from the support structure. The second blade is adapted to push collected scum into a collecting device, such as a conventional scum box.

BRIEF DESCRIPTION OF THE DRAWINGS

FIG. 1 is a fragmentary sectional view taken generally in a vertical plane extending radially through a preferred embodiment of the clarifier of the present invention.

FIG. 2 is an enlarged fragmentary end elevational view of the skimming mechanism.

FIG. 3 is an enlarged fragmentary top plan illustrating the outer skimmer blade and its pivotal connection to the inner blade.

FIG. 4 is a diagramatic elevational view illustrating the improved skimming mechanism of the clarifier.

DESCRIPTION OF THE PREFERRED EMBODIMENT

A preferred embodiment of a clarifier 10 that incorporates the improved skimming mechanism 12 of the present invention shall now be described in connection with FIGS. 1–4. The clarifier 10 is of the general type disclosed in the aforementioned trade literature of the Envirotech Corporation. The clarifier includes a cylindrical sidewall 14 having a peripheral launder 16 incorporated in its upper end for receiving effluent liquid from the clarifier. It is noted that an annular weir is adjustably connected to the inner wall of the launder to set the liquid level LL in the clarifier. The clarifier tank further includes a bottom wall made of concrete including a sloped outer portion 18 and an inner portion 20 for containing a relatively large volume of sludge to be thickened. The clarifier further includes a center column 22 and a drive and lift unit 24 supported upon the upper end of the center column. A cage 26 is suspended from the drive and lift unit, and a rake arm structure including a right rake arm 30 and a left rake arm 28 is secured to the cage. A cylindrical baffle or wall 32 is mounted to the center column for forming a feedwell for receiving mixture to be clarified. It may be noted that the influent mixture is fed into the feedwell through a conduit (not shown) suspended from a catwalk 34. The thickened sludge is removed from a sump 36 at the center of the bottom wall of the clarifier.

As previously indicated, the present invention concerns an improved skimming mechanism 12 for removing the scum from the surface of the liquid within the clarifier 10. The improved skimming mechanism 12 is adapted to remain at a fixed elevation; that is to say, the skimming mechanism will remain at a selected elevation even though the lifting unit 24 may raise or lower the rake arms 28 and 30. Generally, the skimming mechanism includes an inner blade 40 and an outer blade 42. The outer blade is pivotally mounted to the inner blade and is adapted to push scum into a scum collecting box 44. The scum box has an outlet conduit 46 extending therefrom through the sidewall 14 of the clarifier. As in the aforementioned trade literature and in the Kelly et al Patent 2,647,870, the scum box has a sloped upstream portion against which the pivotally mounted outer blade is adapted to ride. Thus, as the inner and outer blades are rotated, scum is swept from the surface of the liquid and is permitted to flow outwardly, with the outer blade being adapted to ride over the scum box to push the scum therein.

Referring now to FIGS. 2 and 4, it will be seen that the inner skimmer blade is slideably supported on a vertical frame 50 that is fixed at its lower end of the outer end of one of the rake arms 28 or 30. The support frame 50 projects vertically upwardly from the cage arm to a height above the liquid level LL. As best depicted in FIG. 4, the frame 50 includes a pair of rails 52 and 54 that extend upwardly from the rake arm and a further pair of relatively short rails 56 and 58 that are respectively affixed to the upper ends of the rails 52 and 54. A pair of shafts or rods 60 (FIG. 2) are affixed to the upper ends of the rails 52 and 54 at the opposite sides thereof from the rails 56 and 58. The upper ends of the slide rods 60 are affixed to bracket plates 60 connected to the rails 56 and 58 so that the rods are vertically oriented.

The inner skimmer blade 40 is comprised of a metal channel that is approximately eight inches wide. The ends of the blade are connected to cylindrical sleeves or tubes 62 (FIG. 2) that are in turn slideably received upon the slide rods. As indicated in FIG. 2, each sleeve 62 has a stub bolt 63 extending perpendicularly therefrom, upon which the inner blade is mounted.

A pair of cables 66 and 68 are respectively connected to the outer and inner ends of the inner blade 40. It will be seen in FIG. 2 that the outer ends of the cables are connected to the slide tube bolts 63. The cables are threaded over a series of pulleys, including pulleys 70 connected to the mounting plates 60 that are incorporated in the upper end of the support frame 50. The cables are thereafter entrained upon a series of pulleys 72-76 (FIG. 4) that are mounted to the feedwell baffle 32 and the cage 26. The inner ends of the cables are connected to that part of the drive and lift unit 24 which rotates with the rake arm structure but which does not raise or lower with the rake arm structure when actuated by the lift unit 24. As shown diagramatically in FIG. 3, the drive and lift unit includes an outer ring 82 that is rotatably mounted by conventioned bearings to an inner ring (not illustrated). The inner ring is stationarily secured to the top of center column 22. The drive unit further includes a cage 84 that is secured to the outer ring and that is sized so that it may telescope within the upper end of the cage 26 from which the rake arms are supported. The inner ends of the cables are connected by brackets to the aforesaid inner cage of the telescoping cage drive unit. The cable 66 is longer than cable 68 and their lengths are selected to horizontally suspend the blade 40 at a selected stationary elevation. It should be noted that the drive and lift unit 24 is a conventional Telescoping Cage Lifting Device manufactured and sold by the EIMCO Process Machinery Division of the Envirotech Corporation and that such unit has been commercially available for several years. The unit includes a drive motor, a separate lift motor, four screw jacks 85 at the corners of the cage that couple the cage 84 to the cage 26, and a chain drive between the jack screws and lift motor adapted to drive the four jack screws at the same speed. An automatic control for actuating the lift motor is provided; this control is sensitive to the torque exerted on the rake arms so that the rake arms are lifted when the torque exceeds a predetermined amount.

It will be understood from the foregoing that the cable mounting of the inner blade 40 to the rotating but fixed elevation portion of the drive and lift unit 24 causes the inner blade to stay at the elevation of the liquid level LL dependent upon the length of the cables 66 and 68. The blade stays at such elevation even though the rake arm structure may be raised or lowered dependent upon the amount of torque applied to the rake arm structure 28, 30.

The outer blade 42 is pivotally supported on a support rod or shaft 90 that projects radially outwardly (relative, of course, to the clarifier tank) from the inner blade. As shown in FIG. 3, the support rod 90 is secured by a connecting plate 92 to the inner blade. The outer blade is comprised of a flat rectangular plate 94 and an elastomeric flap connected to the lower edge of the plate 94. The plate 94 is suspended from the support rod 90 by a pair of support brackets, the inner ends of which are pivotally received on the support rod. A collar assembly 99 is affixed to the support rod thereto for preventing the plate and flap from pivoting downwardly from a rest position at which the plate and flap are approximately vertically oriented. Thus the skimmer plate 94 is free to pivot upwardly. The scum box 44 is adapted to cooperate with the plate (and resilient flap) to capture the scum as it is pushed into the box. The outlet conduit 46 is connected to the scum box for removal of scum from the clarifier. It is noted that the construction of the plate 94, attached resilient flap and the bracket arms 98 is conventional and is incorporated in the commercially available unit disclosed in the aforementioned trade literature.

Although the improved clarifier of the present invention has been described with reference to a specific preferred embodiment, it is to be understood that such embodiment constitutes only one preferred embodiment of the invention and that it is intended that other modifications or equivalents will come within the scope of the following claims.

What is claimed is:

1. An improved rotary sedimentation apparatus of the type including a cylindrical tank having a bottom wall, at least one rake arm structure adapted to push thickened mixture inwardly toward the center of the bottom wall, a drive and lift unit that is located at the center of the tank and that is connected to the rake arm for rotating the rake arm about the center of the tank and for selectively raising the rake arm, wherein the improvement comprises: an inner skimmer blade, an outer skimmer blade, a support structure vertically affixed to the rake arm, means for slideably mounting the inner blade in a radial orientation relative to the tank and for vertically sliding movement upon the support structure, said drive and lift unit including a portion which is adapted to rotate with the rake arm but which does not change its elevation when the rake arm is lifted or lowered, a cable connected between said inner blade and said last mentioned part, said cable having a length adapted to suspend the inner blade at the surface level of the liquid in the clarifier, means for pivotally mounting the outer blade to the inner blade to permit the outer blade to swing about an axis that extends radially of the tank, and scum collecting means that cooperates with the outer blade to collect scum urged forwardly ahead of the outer blade.

2. The improved clarifier according to claim 1 wherein said means for mounting the inner blade to the support structure comprises: said support structure including a pair of vertical slide members, a sleeve slideably mounted on each of said slide members, and means for connecting the inner blade to said sleeve members.

3. The improved clarifier according to either claim 1 or claim 2, wherein two cables are provided, one of the cables being connected to the inner end of the inner blade, and the other of the cables being relatively longer and being connected to the outer end of the inner blade.

* * * * *